United States Patent [19]

McKee et al.

[11] 3,863,235

[45] Jan. 28, 1975

[54] PHASE SENSITIVE POSITION PICKOFF DEVICE

[75] Inventors: Donald Eugene McKee, Placentia; James Edward Rau, Anaheim, both of Calif.

[73] Assignee: Rockwell International Corporation, El Segundo, Calif.

[22] Filed: Feb. 20, 1973

[21] Appl. No.: 333,572

[52] U.S. Cl............. 340/195, 340/189 M, 340/203
[51] Int. Cl............................................ G08c 19/16
[58] Field of Search........................... 340/196, 195

[56] References Cited
UNITED STATES PATENTS

| | | | |
|---|---|---|---|
| 2,518,149 | 8/1950 | Kearsley | 340/192 |
| 3,064,191 | 11/1962 | Dever | 340/196 |
| 3,068,386 | 12/1962 | Jaeger | 340/196 |
| 3,154,946 | 11/1964 | Ordorica | 340/196 |

*Primary Examiner*—Thomas B. Habecker
*Attorney, Agent, or Firm*—L. Lee Humphries; H. Fredrick Hamann; Rolf M. Pitts

[57] ABSTRACT

In an electrically inductive motion detector of the type having a pair of permanently magnetized pole pieces, each magnetized with a non-alternating polarization, and adjacent a movable magnetic armature element and mutually spaced apart in a direction parallel to preselected motion of the armature element, a sensor winding wound upon a respective one of the pole pieces, logic device for indicating the time of coincidence of the position of the armature element and a reference position during said preselected motion thereof. The logic device comprises phase sensitive device responsive to the time-phases of that voltage induced in each of said sensor windings to provide a two-state output, the duration of a preselected state of which being indicative of a preselected set of concomitant states of the relative time phases of those voltages induced in the sensor windings; and further comprises a signal gate responsive to a preselected induced phase state of a preselected one of the sensor windings and having a gate control input responsive to a preselected sense of the interval difference between the duration and non-duration of the preselected set of concomitant states for providing a gated output signal corresponding to the occurrence of said coincidence.

10 Claims, 8 Drawing Figures

PHASE SENSITIVE POSITION PICKOFF DEVICE

RELATED CO-PENDING APPLICATIONS

1. U.S. Application Ser. No. 138,537 filed Apr. 29, 1971 now abandoned by George A. Dyer for Phase Sensitive Position Pickoff Device.

BACKGROUND OF THE INVENTION

In the operation of anti-skid braking systems and other devices, rotational speed of a braked wheel or other rotating member of interest may be determined by measurement of the periodicity at which an index point on the rotating member rotates past a reference position on a frame on which the rotating member is rotatably mounted. In other words, the rotational velocity is determined as a number of induced pulses or other events per unit time (EPUTs), as is well understood in the art. See for example copending application Ser. No. 317,993 filed Dec. 26, 1972, and assigned to Rockwell International Corporation, assignee of the subject application.

In one approach, a disc with regularly spaced teeth of magnetic material about the periphery thereof may serve as an armature or rotor of an inductive pickoff, and an E-core employed to sense when a respective one of the teeth is at the index position. Such sensing may involve phase-detection of a null amplitude analog differential output signal from the two sensor windings of the E-core, as is well understood in the art.

Some of the disadvantages of such position-indicating system are (1) amplitude sensitivity to run-out motion or armature motion in an axial direction (as distinguished from rotational motion), (2) output response to time-phase quadrature components of the a-c excitation in the presence of the desired phase-detected null response, and (3) the difficulties in employing the null signal (as compared to a peak signal or pulse) indicative of the reference position.

One means for avoiding the problems of a null reference signal response and of mechanical run-out is taught in copending U.S. patent application Ser. No. 138,537 filed Apr. 29, 1971 by George A. Dyer for Phase Sensitive Position Pickoff Device, and assigned to North American Rockwell Corporation, assignee of the subject application. In the arrangement of such copending application, a folded E-core is employed in generation of a phase-sensitive output signal indicative of a central or reference position of the armature, and clocked bistable signalling means responsive to phase-state changes of the E-core output signal, is clocked in time-phase quadrature relative to a-c excitation of the E-core excitation winding, a preselected state-change of the two-state output of the bistable signalling means being indicative of a reference position of the armature.

Although sensitivity to axial run-out is reduced by recessing an intermediate portion of the pole pieces of the folded E-core in the region of such run-out, the device is yet somewhat amplitude-sensitive to such run-out to the extent of assymmetries in the folded E-core construction.

In other words, such device requires a-c excitation of an excitation winding of the E-core sensor, quadrature time phase shifting of a reference input to the phase-sensitive logic processor, and requires a high degree of sensor symmetry to avoid axial run-out response.

SUMMARY OF THE INVENTION

By means of the concept of the present invention of digitally processing the output of a permanent magnet type inductive pickoff system, the above-noted disadvantages and limitations of the prior art are avoided and there is provided an inductive type transducer system having a pulsed output response to motion of the armature past a null or reference position.

In a preferred embodiment, there is provided a transducer comprising a pair of permanently magnetized pole pieces, each having a sensing winding wound thereupon, the pole pieces being mutually spaced apart in a direction parallel to the desired (rotational) motion of an armature of the transducer by an amount substantially equal to the distance between a leading edge and a trailing edge of an armature element (e.g., one-half a spatial period) plus an integer number of periodic armature element spacings.

There is also provided means responsive to the phase state output of the two transducer windings for determining the relative duration of a preselected set of concomitant states of the relative time-phases of the voltages induced in the sensor windings. There is further provided gating means responsive to a preselected induced phase-state of a preselected one of the sensor windings and having a gate control input responsive to a preselected sense of the interval difference between a preselected sense of the interval difference between the duration and non-duration of the preselected set of concomitant phase-states for providing a gated output signal.

In normal operation of the above-described arrangement, the periodicity of the gated output signal corresponds to the periodicity or angular velocity of the rotatably mounted armature, being preselectively responsive to the sequence of mutually-opposed phases induced in the two sensor windings by such rotational motion. On the other hand, vibration-induced axial run-out motion induces component signal voltages of like relative phases in the two windings and as to which the logic gating does not respond.

Accordingly, it is an object of the subject invention to provide a phase-sensitive motion transducer system.

It is another object of the invention to provide a phase-sensitive motion transducer which is substantially non-responsive to amplitude modulation of the induced sensor signal.

A further object is to provide rotary motion detection means which is substantially insensitive to vibration or axial run-out motion.

These and other objects of the invention will become apparent from the following description, taken together with the accompanying drawings, in which:

BRIEF DESCRIPTION OF THE DRAWINGS

In the figures, like reference characters refer to like parts.

DESCRIPTION OF THE PREFERRED EMBODIMENTS

Figure 1:
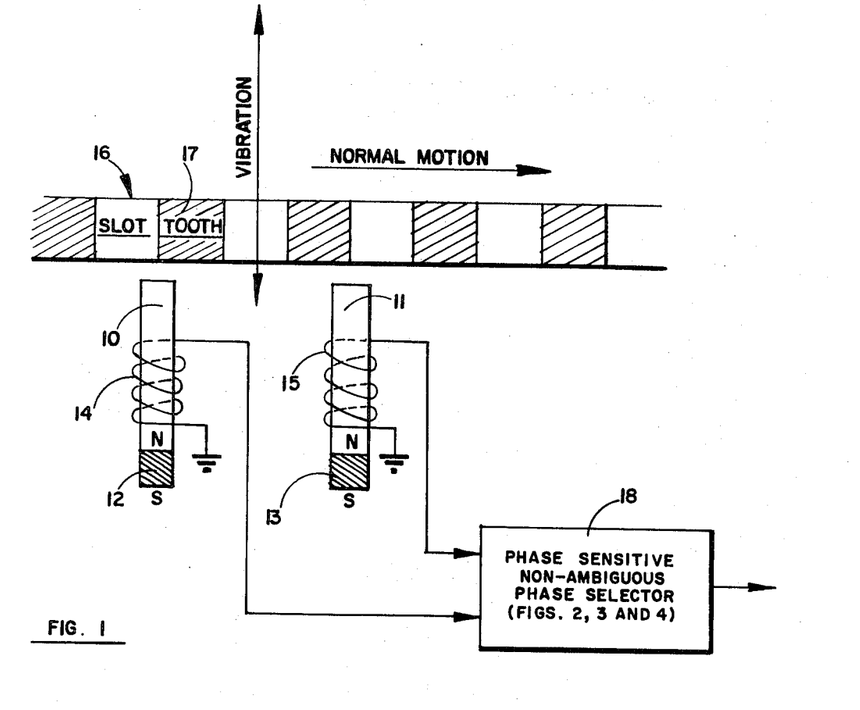
FIG. 1 is a schematic diagram of the arrangement of the transducer elements employed in the invention, and illustrating the desired and undesired components of relative motion of interest.

Referring to FIG. 1, there is illustrated a schematic arrangement of the transducer elements employed in the invention, and also depicting certain components of relative motion therebetween. There is illustrated a pair of like pole pieces 10 and 11, similarly permanently magnetized by magnets 12 and 13 and each having a sensing winding 14 and 15 wound thereupon. There is also provided an armature 16 such as a slotted disc rotatably mounted relative to pole pieces 10 and 11, and having regularly spaced teeth of a magnetic material, pole pieces 10 and 11 being mutually spaced apart in a direction parallel to the plane of rotation of armature 16 by an amount substantially equal to the distance between a leading edge of and a trailing edge of a tooth 17 plus an integer number of tooth intervals. A respective input of a data processor 18 (shown more particularly in FIG. 2) is coupled to a mutually exclusive one of windings 14 and 15.

In normal operation of the device of FIG. 1, normal rotation (as shown) of armature disc 16 carries one of magnetic teeth 17 into magnetic proximity of pole piece 11 as a tooth is departing such proximity of pole piece 10. Thus, such motion serves to induce an EMF in each of windings 14 and 15 (corresponding to curves 21$a$ and 21$b$, respectively, in FIG. 5), the induced EMF in each winding being of one sense or polarity as the tooth progresses toward it, and being of the opposite sense as the tooth passes and progresses away from the winding. However, the space phasing or distance between pole pieces 10 and 11 cause the relative senses or time phases of the EMF's concomitantly induced in the two windings to be substantially anti-phased. Where, however, an induced EMF occurs due to vibration or motion perpendicular to the normal motion illustrated in FIG. 1, then the relative senses or time-phases will be substantially mutually like-phased, as shown by curves 121$a$ and 121$b$ in FIG. 6. By means of processor 18, such phase-data may be differentially processed as to be substantially insensitive to vibration-induced EMF's and sensitive or responsive principally to normal rotational motion of armature disc 16, as is described more particularly in connection with the description of FIG. 2.

Figure 2:
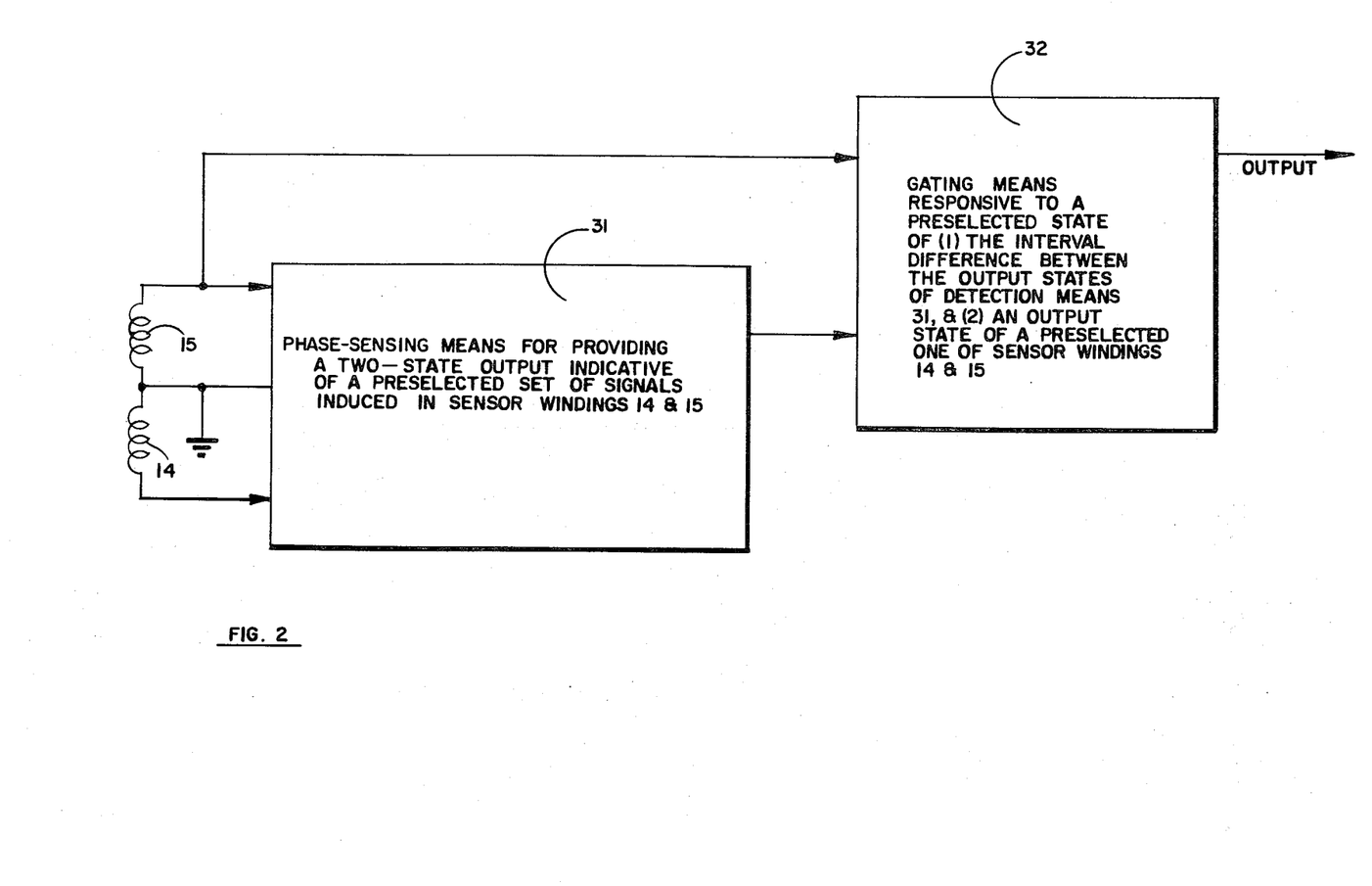
FIG. 2 is a schematic arrangement in block form of a system embodying the concept of the invention.

Referring now to FIG. 2, there is illustrated a schematic arrangement in block diagram form of a system embodying the concept of the invention. There is provided state set means 31 for providing a two-state output indicative of a preselected set of concomitant sense, or phase, states of the EMF's induced in sensor windings 14 and 15. There is also provided gating means 32 responsive to a preselected state of (1) the interval difference between the several states of the two-state output of element 31 and (2) an output state of sensor winding 15, for providing a gated output indicative of motion of the armature 16 (of FIG. 1) past a preselected reference or index position relative to pole pieces 10 and 11. Such cooperation may be further appreciated from a consideration of the detail embodiment depicted in FIG. 3.

Figure 3:
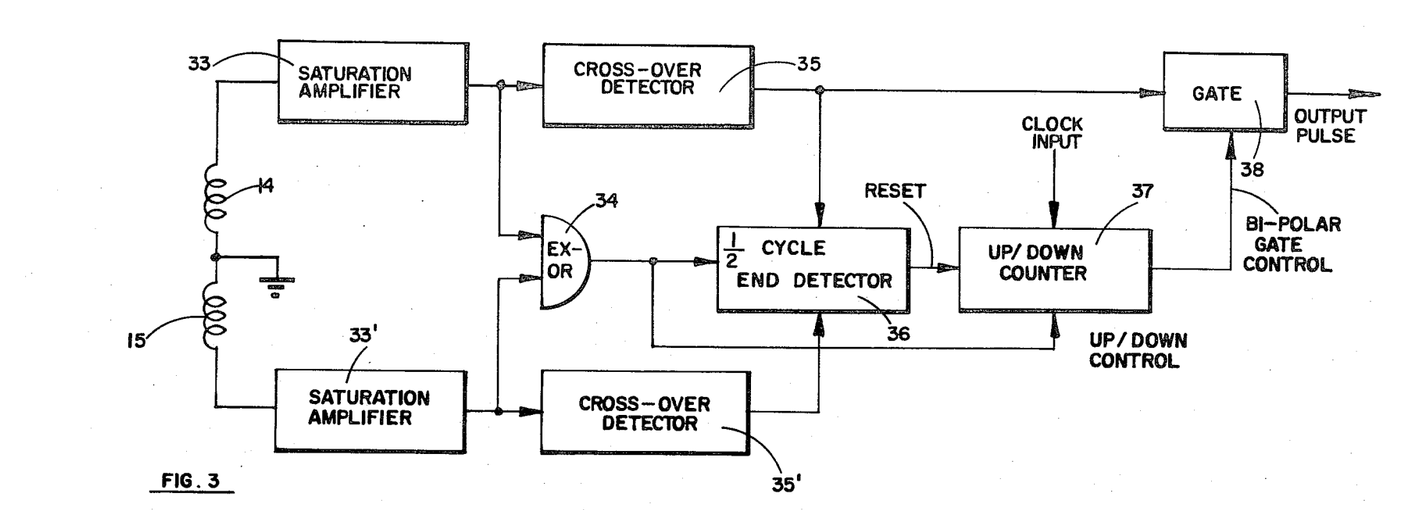
FIG. 3 is a block diagram illustrating the system of FIG. 2 in fuller detail.

Referring now to FIG. 3, there is illustrated in block diagram form a system depicting the concept of FIG. 2 in fuller detail. There is provided a first and second high-gain saturating amplifier 33 and 33' responsively coupled to a respective one of sensor windings 14 and 15 for providing a respective bipolar output, the state of which is indicative of the polarity, sense or phase, of an EMF induced therein by motion of armature element 16 and corresponding to curves 22$a$ and 22$b$ in FIG. 5. An exclusive-OR gate 34 is responsively coupled to amplifiers 33 and 33' for providing an output indicative of the occurrence of a preselected output phase state of either of amplifiers 33 and 33' and corresponding to waveform 23 in FIG. 5. In other words, OR gate 34 provides a "true" state output when the two binary inputs thereto are of mutually opposite states. Additionally, the outputs of amplifiers 33 and 33' are fed to respective ones of cross-over detectors 35 and 35' to obtain timing data corresponding to waveforms 24$a$ and 24$b$ of FIG. 5. Such timing pulses and the output state of gate 34 are employed by a logic element 36 to provide a bipolar output signal (waveform 25 in FIG. 5), the occurrence of a preselected state of which is indicative of the occurrence of a preselected set of concomitant states of the relative time phases of the induced EMF's in windings 14 and 15. Such state set corresponds to the occurrence of mutually opposite relative phases between waveforms 21$a$ and 21$b$.

A clocked up/down counter 37 is employed to determine the relative intervals of the duration and non-duration of the preselected time phase set and provide an output corresponding to the sense of the interval difference therebetween. Accordingly, a reset input of counter 37 is responsively coupled to the two-state output of logic element 36 for commencing a counting sequence, in response to a preselected state corresponding to the end of a half cycle of the cyclic outputs of a preselected one of windings 14 and 15 (say, waveform 21$b$ of winding 15), while an up/down control input is responsively coupled to OR gate 34 (waveform 23).

Figure 5:
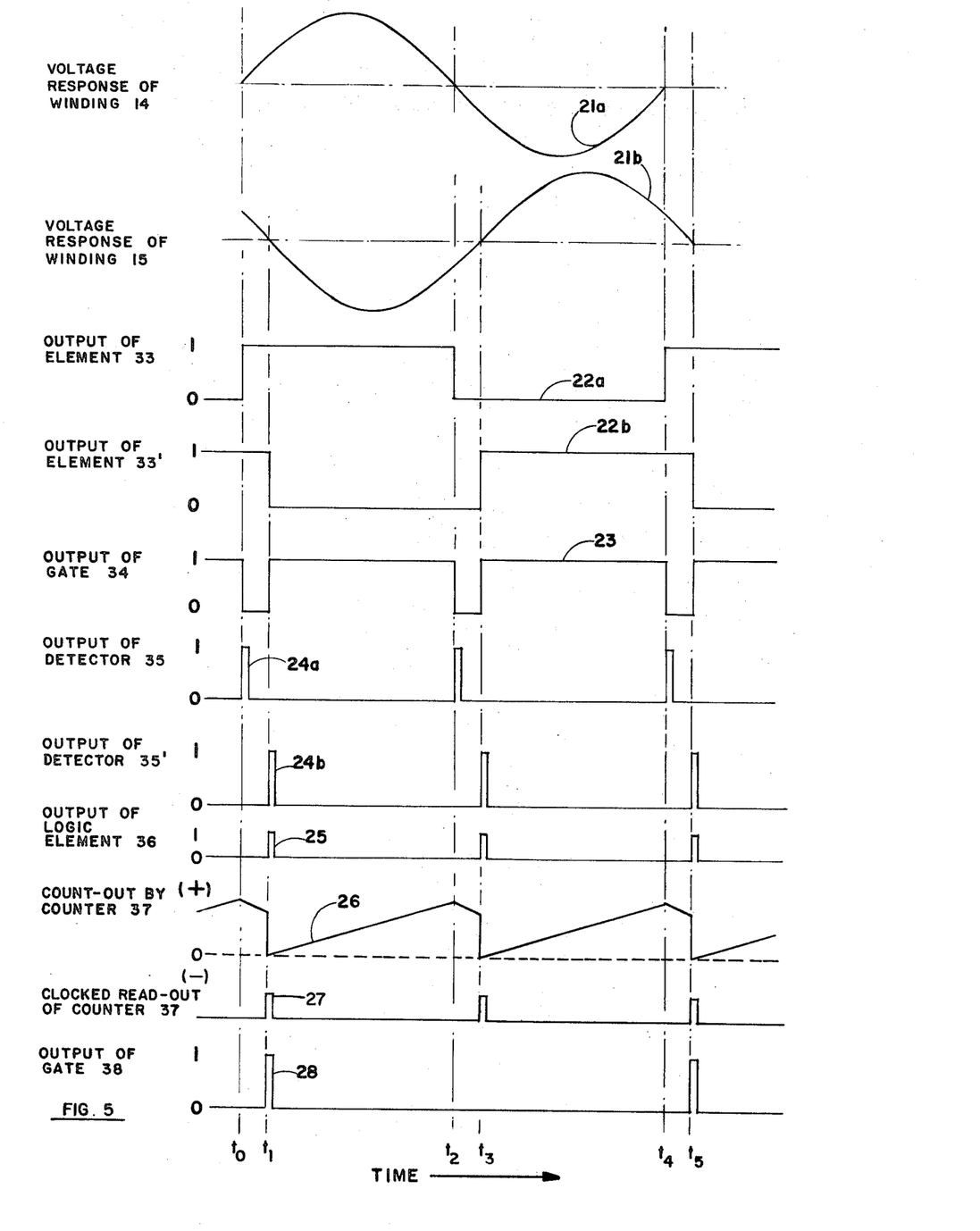
FIGS. 5 and 6 are families of representative time histories, illustrating the response of the system of FIG. 3 to the representative motions depicted in FIG. 1.

In normal operation, counter 37 starts a counting interval upon the end of each half cycle of the periodic EMF induced in element 15 (of FIG. 3) corresponding to the crossover points of curve 21$b$ (at $t_1$, $t_3$ and $t_5$) in FIG. 5, such count-out being illustrated as curve 26 in FIG. 5. The illustrated sense of the count (slope of curve 26) is positive, or an up-count, within the interval between resettings of the counter by logic element 36 (waveform 25 in FIG. 5) in response to an up-count control state of the control input (waveform 23) from element 34. Such up-count control state is indicated by the 1 state of curve 23 occurring during the intervals $t_1$–$t_2$ and $t_3$–$t_4$; and corresponds to the coincidence of mutually anti-phase portions of waveforms 22$a$ and 22$b$. A down-count (negative slope of curve 26) occurs during the intervals $t_2$–$t_3$ and $t_4$–$t_5$ in response to the O state of curve 23 (exclusive OR gate 34), corresponding to mutually in-phase portions of waveforms 22$a$ and 22$b$. Thus, at the end of each half cycle of curve 21$b$ (element 15) and upon read-out and resetting of clocked counter 37, there is provided (subsequent to read-out time $t_3$ and $t_5$) a counter read-out output corresponding to the sense of the difference between the up-count and down-count intervals and illustrated as waveform 27 in FIG. 5. For the case depicted in FIG. 5 for normal armature motion, a positive sense is indicated for such clocked counter read-out (curve 26 at $t_3$ and at $t_5$).

The positive sense of the counter read-out for the normal case depicted in FIG. 5 is employed as a gate-control signal (waveform 27) for gate 38, which, in coincidence with a further input of a preselected sense from detector 35, provides an output (waveform 28) which signals the motion of a tooth 17 (of armature 16 in FIG. 1) past winding 14 on pole piece 10.

Figure 6:
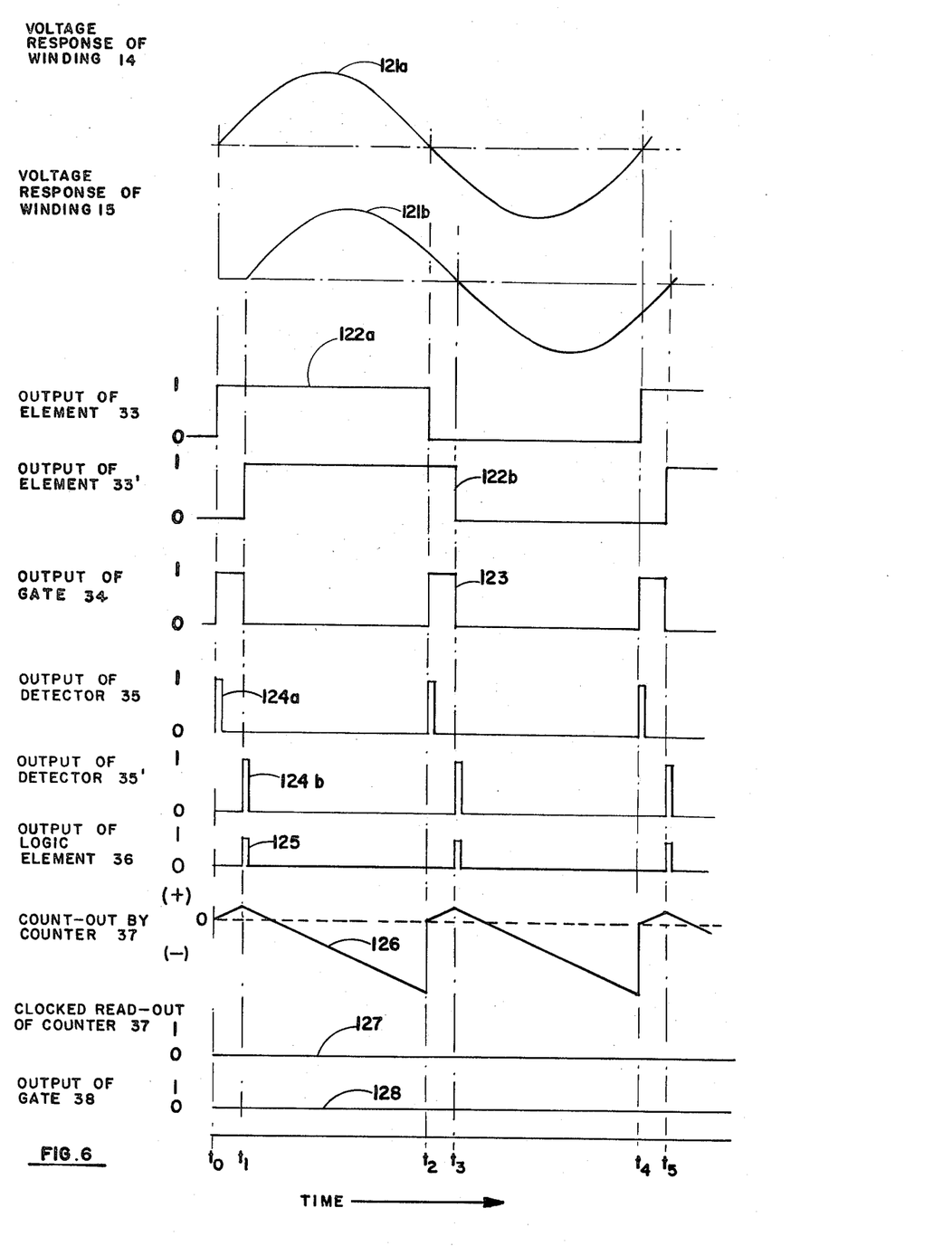

In the case of vibrational motion or motion perpendicular to the normal motion direction depicted in FIG. 1, no response thereto is provided at the output of gate 38, as shown in FIG. 6.

Referring now to FIG. 6, there is illustrated an exemplary time history of the response of the device of FIG. 3, the last two digits of the reference characters for the waveforms corresponding to the like two digit reference characters employed in FIG. 5. From examination of such time histories, it is clear that the vibrational motion or mode indicated in FIG. 1 results in a more nearly co-phasal response of windings 14 and 15 as indicated by waveform pair 121a and 121b and pair 122a and 122b, with a consequential reduced interval of the "true" state of waveform 123. Such reduced "true" state interval for gate 34 and increased "false" state interval thereof results in a net negative sense of the half cycle count upon read-out of counter 37 (waveforms 126 and 127 at $t_2$ and $t_4$). Such "false" state of the counter read-out effectively blocks gate 38 from responding to the preselected half cycle of waveform 122b, whereby no periodic output or output change occurs at gate 38. In other words, false signalling to spurious motion, or a phasal relation not of interest, is avoided.

In a preferred embodiment of the arrangement of FIG. 3, suitable synchronization or timing control is effected among the components of the functional logic blocks to better assure proper cooperation, as is well understood in the art. Such timing control may be effected by means of clocking, shown in further detail in FIG. 7.

Figure 7:
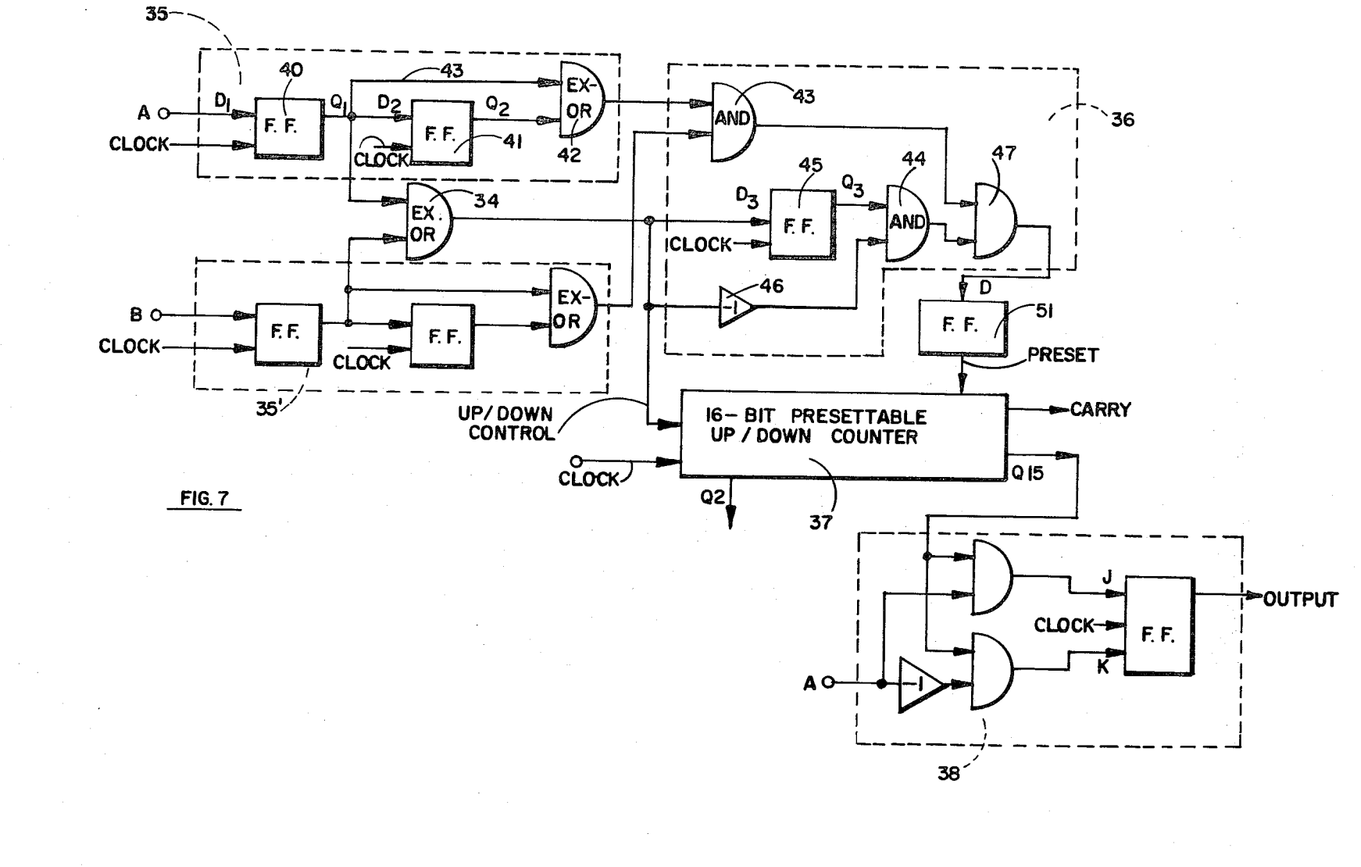
FIG. 7 is a block diagram in further detail of the arrangement of FIG. 3.

Referring to FIG. 7, there is illustrated a preferred embodiment of the logic elements of FIG. 3 in which clocked flip-flops are employed in like detectors 35 and 35', logic element 36 and gate 38. The bipolar input to a respective one of detectors 35 and 35' is fed to a clocked D-type first flip-flop 40, an output of which is fed to a second clocked D-type flip-flop 41 and to exclusive-OR gate 42 of the detector, as well as being fed as one of the two inputs to OR gate 34. The output gate 42 is further responsively coupled to an output of second flip-flop 41. Thus, in normal operation of cross-over detector 35 or 35', a "true" state or preselected binary output state occurs at the output of exclusive OR gate 42 in response to a clocked state change of one sense occurring on the output line 43 of first flip-flop 40 and indicating a first cross-over or start of a first half cycle (of curve 21a), while disabling flip-flop 41. A state change of the opposite sense for flip-flop 40 then removes the "true" state from line 43 while, however, setting clocked second flip-flop 41 in a "true" state, which causes gate 42 to signal a second cross-over or start of a second half cycle (of curve 21a). Accordingly, the pulsed output of gate 42 for element 35 corresponds to the half cycle response of curve 24a in FIG. 5.

Logic means 36 for providing half cycle detection is seen, from FIG. 7, to compromise an AND gate 43 responsive to the outputs of detectors 35 and 35', and also a second AND gate 44 having a first and second input responsively coupled to the output of exclusive OR gate 34 by means of a respective first flip-flop 45 and a phase inverter 46, respectively. (Alternatively, element 44 may be comprised of an AND gate and inverter 46 omitted.) Thus, second AND gate 44 has a first and second input thereof responsively coupled to a respective one of elements 45 and 46. A NOR-type third gate 47 of logic means 36 has a first input responsively coupled to the output of gate 43 and a second input responsively coupled to an output of gate 44.

In normal cooperation of the elements of logic block 36, the end of a half-cycle is determined as the coincidence of a mutually in-phase (0°) or antiphase (180°) relationship between curves 22a and 22b, as indicated by a coincidence of curves 24a and 24b in FIG. 5, and manifested as an associated "true" state output of gate 43 (in FIG. 7). Such cyclical "true" state is applied via inclusive-OR gate 47 to a flip-flop 51 for resetting and reading-out counter 37.

Where, however, waveforms 21a and 21b (and hence waveforms 22a and 22b) are in other than a mutual in-phase or anti-phase relationship, as illustrated, then AND gate 44 and D-type flip-flop 45 cooperate to provide (for a clock interval) a synchronized reset pulse in response to a "true" state output of gate 34 and applied to flip-flop 45, such response appearing at the output of OR-gate 47 and being illustrated in FIG. 5 as waveform 25. Accordingly, it is to be appreciated that logic means 36 cooperates to cause counter 37 to be reset (via flip-flop 51) and read-out (on line Q15 of counter 37) each half cycle at the 0-to-1 state change of waveform 23 (for exclusive OR gate 34) or leading edge of waveform 24b.

Upon reset of counter 37 (corresponding to the start of a half-cycle of waveforms 21b and 22b), an up-count control signal is applied to the control line of counter 37 by gate 34, the "true" state output of gate 34 (waveform 23 at $t_1$–$t_5$) corresponding to the coincidence of mutual anti-phase portions of the half cycles of waveforms 22a and 22b. The duration or interval of such up-count control state is counted by counter 37 and upon a state-reversal of gate 34 (waveform 23 at $t_2$–$t_3$ and $t_4$–$t_5$ and corresponding to phase coincidences of waveforms 22a and 22b), a down-count control signal is applied to the control input of counter 37, as explained above in connection with the description of FIG. 3.

Also occurring upon reset of counter 37 is a two-state read-out on Q15 thereof, a "true" state of which corresponds to the positive sense of waveform 26 subsequent to read-out times $t_3$ and $t_5$ in FIG. 5, and is illustrated by gate control waveform 27. As explained in connection with the description of FIG. 3, a "true" state of such gate control signal, in coincidence with a selected state or half-wave of, say, waveform 22b gates-on output gate 38, thereby generating a pulse output corresponding to the time-phase occurrence of armature motion past a preselected reference position in FIG. 1.

Figure 4:
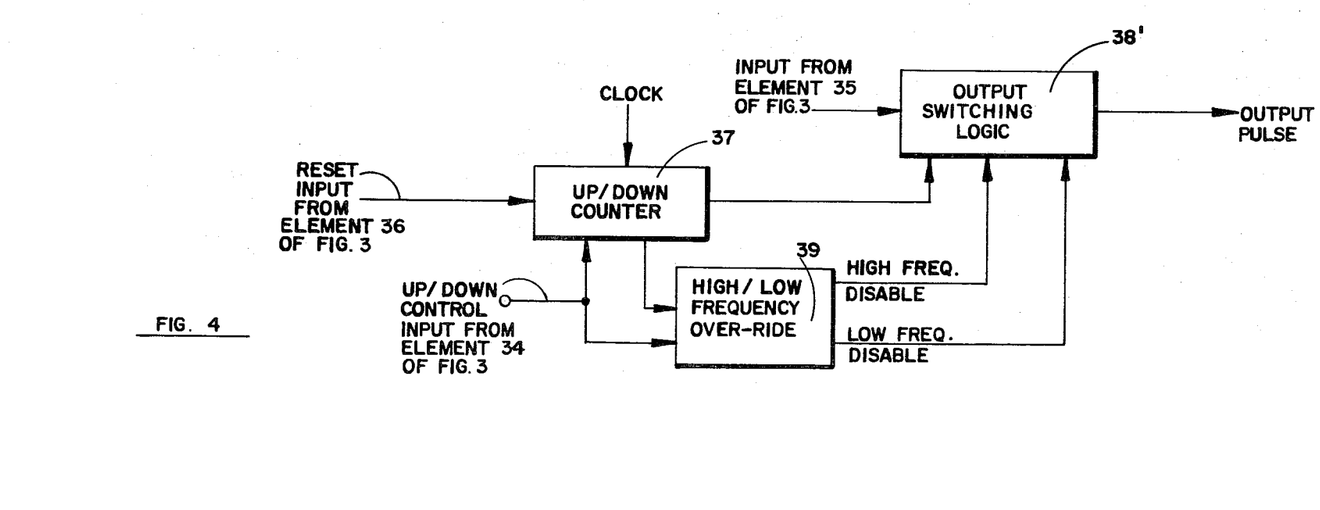
FIG. 4 is a block diagram of an ancillary structural feature for cooperation with the system of FIG. 3.

A refinement of the arrangement of FIGS. 3 and 7 may be the inclusion of high and low frequency rejection means repsonsive to the output of OR gate 34 and to counter 37 for rejecting any signals associated with state changes of gate 34 outside a preselected frequency of occurrence or periodicity as to be indicative of noise or random system inputs not of interest. In this way, an ambiguous response to the numerical limitations of the counter (system low frequency performance limits) are avoided and response to high frequency noise is attenuated. Such ancillary aspect is shown in FIG. 4 by the illustrated cooperation of the high/low frequency override functional block 39 to disable output gating means 38'. Such high/low frequency rejection means is shown more particularly in FIG. 8.

Figure 8:
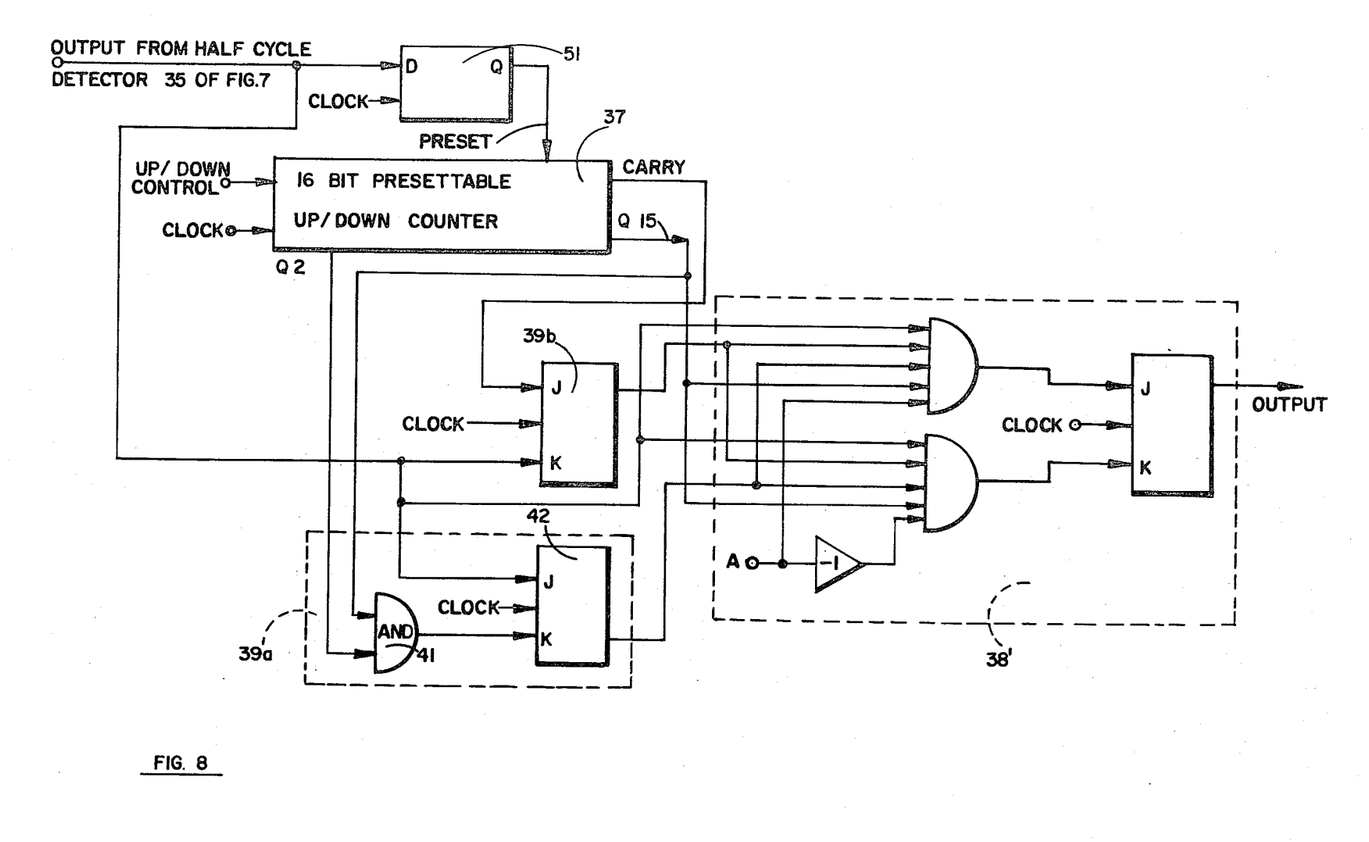
FIG. 8 is a block diagram in further detail of the arrangement of FIG. 4.

Referring to FIG. 8, the frequency-rejection means 39 of FIG. 7 is shown more particularly as high frequency rejection means 39a and low frequency rejection means 39b.

Low frequency rejection means 39b comprises a clocked J-K type flip-flop having a J input responsively coupled to a "carry" output of counter 37 as to be responsive to the end of each full-cycle counted out by counter 37, and further having a K input responsively coupled to the output of half cycle detector 35 (of FIG. 7), an output of flip-flop 39b being fed as an additional logic control or gating signal to output gating means 38'.

As is understood in the art, the truth table for the state $Q_n$ of a clocked J-K type flip-flop in terms of the J and K inputs and a prior state, $Q_{n-1}$, of such flip-flop is as follows:

| J | K | $Q_n$ |
|---|---|---|
| 0 | 0 | $Q_{n-1}$ |
| 0 | 1 | 0 |
| 1 | 0 | 1 |
| 1 | 1 | $\overline{Q}_{n-1}$ |

An updated output state of $Q_n$ in response to the applied J-K inputs is delayed until the occurrence of the next synchronous clock pulse. Accordingly, upon counter 37 reaching an overflow state or maximum count during a half-cycle output of detector 35, gate 38' is disabled. Thus, low frequency rejection occurs in response to waveform 23 being in any one state for longer than that maximum clock time for counter 37 to reach the overflow state.

High frequency rejection means 39a is arranged to test or determine that waveform 23 (in FIG. 5) for element 34 is in a given state (half-cycle) for at least a minimum interval, such minimum interval half-cycle corresponding to the occurrence of a preselected state change on, say, tap Q2 of counter 37. Such frequency rejection means is comprised of an AND gate 41 responsive to the Q2 and Q15 outputs of 16 bit counter 37 and a clocked J-K type flip-flop 42 having a J input responsive to the output of detector 35 (of FIG. 7) and a K input responsive to the output of gate 41.

Accordingly, there has been described a motion detector or position pickoff device responsive to the time-phase associated with a preselected space-phase occurrence of a preselected component motion and substantially non-responsive to both variations in pickoff amplitude response and to spurious motion components.

Although the dual sensor element with which the pickoff device of the invention cooperates has been described in terms of a motion detector of the electrically inductive type, the concept of the invention is not so limited. It is clear that any dual sensor type motion detector may be employed, in which the two sensor elements are spaced apart by a distance corresponding to substantial one-half of the armature element spatial periodicity plus an integer number of such spatial periods.

Also, although the invention has been described in terms of response to a preselected unidirectional motion, the device is not so limited and responds to motion in an opposite direction, it being clear that the dual sensor mutual time phase relationships to which the system responds will be the same in either case.

Further, although the set of mutual time phase relationships to which the phase-sensitive system responds have been described as being generated by or as analogs of periodic space-phase relationships associated with mechanical motion, the device of the invention may be employed for logic gating in response to the duration of a preselected set of concomitant phase states of any pair of cyclical two-state signals.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In a motion detector of the type having two permanent magnet polarized induction sensors responsive to and adjacent a movable armature of periodically-spaced armature elements and mutually spaced apart in a direction parallel to a preselected motion of said armature element by an amount substantially equal to a half of such periodic spacing plus an integer number of such spatial interval, logic means for indicating the time of coincidence of the position of a movable armature element and a reference position during preselected motion thereof, and comprising state set detection means responsive to the time phases of that voltage generated in each of said sensors to provide a two-state output the duration of a preselected state of which being indicative of a preselected set of concomitant states of the senses of those voltages generated in said sensors; and gating means responsive to a preselected induced polarity state of a preselected one of said sensors and having a gate control input responsive to a preselected sense of the interval difference between the duration and non-duration of said preselected set of concomitant states for providing a gated output signal corresponding to said time of coincidence.

2. The device of claim 1 in which said phase sensitive means comprises first and second bipolar signalling means responsive to a respective one of said sensors for providing a two-state output indicative of the polarity state of a signal induced therein by said motion of said armature; and exclusive OR gate means reponsive to said first and second bipolar signalling means for indicating the occurrence of a preselected state in the output of a mutually exclusive one of said bipolar signalling means.

3. The device of claim 2 in which there is further provided
- detection means responsive to state changes of said two-state outputs of said first and second bipolar signalling means and further responsive to said exclusive OR gate means for providing a two-state output signal, the duration of a preselected state of which being indicative of a preselected set of concomitant states of the outputs of said first and second bipolar signalling means; and
- a clocked up/down counter having a counting input responsive to said detection means and a control input responsive to said exclusive-OR gate means for indicating the relative time interval difference between the respective occurrence and non-occurrence of said preselected set of states of said first and second bipolar signalling means, the gating means being coupled to said output of a preselected one of said bipolar signalling means and having a gate control input responsive to the sense of said difference.

4. In an electrically inductive motion detector of the type having two magnetic pole pieces, each magnetized with a permanent magnet; and adjacent a movable magnetic armature element and mutually spaced apart in a direction parallel to a preselected motion of said armature element, a sensor winding wound upon a respective one of said pole pieces, logic means for indicating the time of coincidence of the position of said armature element and a reference position during preselected motion thereof, and comprising
- phase sensitive responsive to the time phases of that voltage induced in each of said sensor windings to provide a two-state output the duration of a preselected state of which being indicative of a preselected set of concomitant states of the relative time phases of those voltages induced in said sensor windings; and
- gating means responsive to a preselected induced phase state of a preselected one of said sensor windings and having a gate control input responsive to a preselected sense of the interval difference between the duration and non-duration of said preselected set of concomitant states for providing a gated output signal corresponding to said time of coincidence.

5. The device of claim 4 in which there is further provided discrimination means responsive to the duration and non-duration of said preselected set of concomitant states for providing a two-state output indicative of the sense of the duration difference therebetween, said gate control input of said gating means being responsive to a preselected output state of said discrimination means.

6. The device of claim 4 in which said phase sensitive means means comprises
- first and second bipolar signalling means responsive to a respective one of said sensor windings for providing a two-state output indicative of the polarity state of a signal induced therein by said motion of said armature; and
- exclusive OR gate means responsive to said first and second bipolar signalling means for indicating the occurrence of a preselected state in the output of a mutually exclusive one of said bipolar signalling means.

7. The device of claim 6 in which there is further provided discrimination means responsive to the duration and non-duration of said preselected set of concomitant states for providing a two-state output indicative of the sense of the duration difference therebetween, said gate control input of said gating means being responsive to a preselected output state of said discrimination means.

8. The device of claim 6 in which said state detection means further includes
- detection means responsive to state changes of said two-state outputs of said first and second bipolar signalling means and further responsive to said exclusive OR gate means for providing a two-state output signal, the duration of a preselected state of which being indicative of a preselected set of concomitant states of the outputs of said first and second bipolar signalling means; and
- a clocked up/down counter having a counting input responsive to said detection means and a control input responsive to said exclusive-OR gate means for indicating the relative time interval difference between the respective occurrence and non-occurrence of said preselected set of states of said first and second bipolar signalling means, the gating means being coupled to said output of a preselected one of said bipolar signalling means and having a gate control input responsive to the sense of said difference.

9. In an electrically inductive motion detector of the type having two magnetic pole pieces, each magnetized with a permanent magnet, and adjacent said armature element and mutually spaced apart in a direction parallel to said preselected motion of said armature element, a sensor winding wound upon a respective one of said pole pieces, logic means for indicating the time of coincidence of the position of a movable magnetic armature element and a reference position during preselected motion thereof and comprising
- phase sensitive means responsive to the polarities of that voltage induced in each of said sensor windings to provide a two-state output the duration of a preselected state of which being indicative of a preselected set of concomitant states of the senses of those voltages induced in said sensor windings;
- discrimination means responsive to the duration and non-duration of said preselected set of concomitant states for providing a two-state output indicative of the sense of the duration difference therebetween;
- gating means responsive to a preselected induced polarity state of a preselected one of said sensor winding and having a gate control input responsive to a preselected output state of said discrimination means for providing a gated output signal corresponding to said time of coincidence.

10. In an inductive motion detector of the type having two magnetic pole pieces, each magnetized with a permanent magnet, and mutually spaced apart in a plane adjacent and parallel to said preselected motion of said armature, a sensor winding wound upon each of said pole pieces, for logic means indicating the time of coincidence of the position of a movable magnetic armature element and a reference position located between said pole pieces during preselection motion of said armature and comprising first and second bipolar signalling means responsive to a respective one of said sensor windings for providing a two-state output indicative of the polarity state of a signal induced therein by said motion of said armature;

exclusive OR gate means responsive to said first and second bipolar signalling means for indicating the occurrence of a preselected state in the output of a mutually exclusive one of said bipolar signalling means;

half cycle end sensing means responsive to state changes or sait two-state outputs of said first and second bipolar signalling means and further responsive to said exclusive OR gate means for providing a two-state output signal, the duration of a preselected state of which being indicative of a preselected set of concomitant states of the outputs of said first and second bipolar signalling means; said a clocked up/down counter having a counting input responsive to said half cycle end detection means and a control input responsive to said exclusive OR gate means for indicating the relative time interval difference between the respective occurrence and non-occurrence of said preselected set of states of said first and second bipolar signalling means;

output gating means coupled to said output of a preselected one of said bipolar signalling means and having a gate control input responsive to the sense of said difference, for providing a gated output pulse the occurrence of which corresponds to the preselected motion of said armature past said reference position.

* * * * *